United States Patent
Lam

(10) Patent No.: US 11,086,930 B2
(45) Date of Patent: Aug. 10, 2021

(54) METHOD OF PLAYING MUSIC AND COMPUTER WITH FUNCTION OF PLAYING MUSIC

(71) Applicant: Tymphany Acoustic Technology Limited, Taipei (TW)

(72) Inventor: Yick Hong Lam, Taipei (TW)

(73) Assignee: Tymphany Acoustic Technology Limited, Taipei (TW)

( * ) Notice: Subject to any disclaimer, the term of this patent is extended or adjusted under 35 U.S.C. 154(b) by 0 days.

(21) Appl. No.: 17/021,605

(22) Filed: Sep. 15, 2020

(65) Prior Publication Data
US 2021/0081448 A1    Mar. 18, 2021

(30) Foreign Application Priority Data
Sep. 17, 2019 (CN) .......................... 201910877129.3

(51) Int. Cl.
| | | |
|---|---|---|
| *G06F 16/638* | (2019.01) | |
| *G06F 16/68* | (2019.01) | |
| *G06F 16/683* | (2019.01) | |
| *G06F 16/64* | (2019.01) | |

(52) U.S. Cl.
CPC .......... *G06F 16/639* (2019.01); *G06F 16/64* (2019.01); *G06F 16/685* (2019.01); *G06F 16/686* (2019.01)

(58) Field of Classification Search
CPC ...... G06F 16/638; G06F 16/64; G06F 16/683; G06F 16/68; G06F 16/4387

USPC .................. 700/94; 715/716, 704, 758, 723; 707/693, 913, 736, 749, 705, 748, 770, 707/752
See application file for complete search history.

(56) References Cited

U.S. PATENT DOCUMENTS

| | | | | |
|---|---|---|---|---|
| 2010/0042595 | A1* | 2/2010 | Chen ..................... | G11B 27/326 707/728 |
| 2010/0076983 | A1* | 3/2010 | Gates ................... | G06F 16/9535 707/749 |
| 2010/0306656 | A1* | 12/2010 | Moloney ................. | G06F 16/70 715/723 |
| 2012/0290932 | A1* | 11/2012 | Johnson ............... | G11B 27/105 715/716 |
| 2013/0254207 | A1* | 9/2013 | Coburn, IV ........ | G06F 16/4387 707/740 |
| 2015/0268932 | A1* | 9/2015 | Reblitz-Richardson .................... | G06F 3/04842 707/752 |

* cited by examiner

*Primary Examiner* — Melur Ramakrishnaiah
(74) *Attorney, Agent, or Firm* — Muncy, Geissler, Olds & Lowe, P.C.

(57) ABSTRACT

A method of playing music includes providing a playing pool, where the playing pool includes a plurality of playlists, each playlist includes at least one piece of music, and each piece of music includes at least one attribute; comparing all music in any two playlists, and if at least one attribute of any two pieces of music is determined to be identical, defining the music as pairing music, where the pairing music is not music the same playlist; and playing the music in one of the plurality of playlists, and when a playing sequence comes to the pairing music, playing the music according to the pairing music.

11 Claims, 5 Drawing Sheets

METHOD OF PLAYING MUSIC AND COMPUTER WITH FUNCTION OF PLAYING MUSIC

BACKGROUND

Cross Reference to Related Applications

The present application claims priority to Chinese Patent Application No. CN 201910877129.3, which was filed on Sep. 17, 2019 the entire contents of which are hereby incorporated by reference.

TECHNICAL FIELD

The present application relates to a method of playing music, and more particularly to a method of automatically selecting to play music.

RELATED ART

Playing music by a mobile phone or a computer has been developed for a long time. Users can establish various playlists according to their own preferences. However, repeated listening according to the playlist will be boring.

Therefore, one method for solving the problem of repeated playing in the field of playing music is to provide a shuffle feature to the playlist. However, the result of such a playing is often non-random and still results in certain repeated playing. This is due to the computer following instructions and there is always a pattern or algorithm. These difficulties are a known issue in the computer world and there is a lack of an efficient solution to generate true random results. Additionally, randomly played music may not be the music which the users really want to listen to, since its playing may be completely irrelevant to the user.

In addition, another solution to music playing has been developed, called mashup, which mixes the tracks from multiple playlist into one resultant playlist. However, mashup of multiple playlists may potentially break the flow of the listening experience, and a user often establishes a playlist by a single theme. However, the theme could be related to different type of attributes, e.g. genre, mood, published time, lyrical reasons, etc. Shuffle and mashup will break these logical reasons of how the user arranges the playlist, which make the result undesired. That is, these play logics are generally not really wanted by the user, and the played music is not the music which the users really want to listen to.

SUMMARY

The present application provides a method of playing music, including providing a playing pool, wherein the playing pool comprises a plurality of playlists, each playlist comprises at least one piece of music, and each piece of music comprises at least one attribute; comparing all music in any two playlists, and if at least one attribute of any two pieces of music is determined to be identical, defining the music as pairing music, wherein the pairing music is not in the same playlist; and playing the music in one of the plurality of playlists, and when a playing sequence comes to the pairing music, playing the music according to the pairing music.

In an exemplary embodiment, according to the attributes, a user selects any one attribute as a defined attribute. In the step of comparing all music in any two playlists, at least one attribute of any two pieces of music is determined to be identical and to be respectively the defined attribute.

In an exemplary embodiment, if any one attribute of any two pieces of music is not determined to be identical, a prompt is displayed to the user.

In an exemplary embodiment, any of pairing music is randomly selected, and according to the selected pairing music, the music in playlist of the selected pairing music is played.

In an exemplary embodiment, the attributes include a singer name, a song name, an album name, a publication year, a rock and roll type, a blues type, a ballad type and/or a lyric type.

In an exemplary embodiment, the step of providing the playing pool includes: automatically selecting playlists to form the playing pool.

In an exemplary embodiment, the step of providing the playing pool includes: manually selecting at least two playlists by the user to form the playing pool.

Additionally, the present application further provides a computer with a function of playing music, including a processor and a memory electrically connected to each other. The memory includes a software program. The computer is characterized in that the processor executes the software program of the memory to achieve the above method of playing music.

Based on the above, when the users select the attribute of music which they want to listen to, according to the method of the present application, high similarity can be achieved. A result that the music which the users really want to listen to is provided can be achieved.

DETAILED DESCRIPTION

To fully understand the objectives, features, functions of the present application, the present application is described in detail by using the following specific embodiments and in cooperation with the accompanying drawings. The description is as follows.

Figure 1:
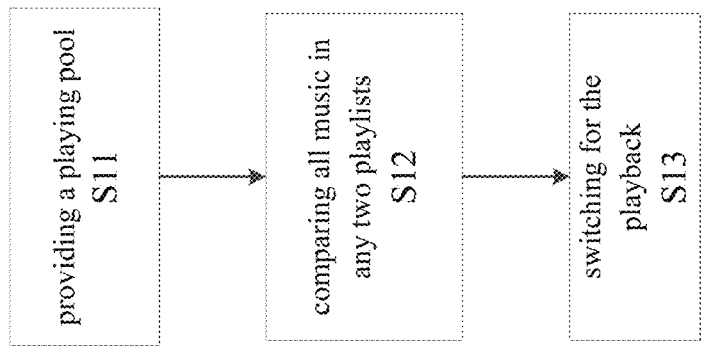
FIG. 1 is a flowchart according to a method of playing music according to an exemplary embodiment of the present invention.

Referring to FIG. 1, the present application provides a method of playing music, including Steps S11-S13.

Step S11: providing a playing pool. The playing pool includes a plurality of playlists. Each playlist includes at least one piece of music. Each piece of music includes at least one attribute. Preferably, the attributes may include: a singer name, a song name, an album name, a publication year, a rock and roll type, a blues type, a ballad type and/or a lyric type, etc., or other metadata related to the music.

Step S12: comparing music in any two playlists from the playing pool. If at least one attribute of any two pieces of music is determined to be identical, the music is defined as pairing music. The pairing music (two pieces of music) is not on the same playlist, that is, each playlist has one piece of paring music.

Step S13: switching for the playback. The music is played based on any one playlist. When a playing sequence comes to one of the pairing music, according to the pairing music, the playing sequence comes to another one of paring music in the playlist.

Figure 2:
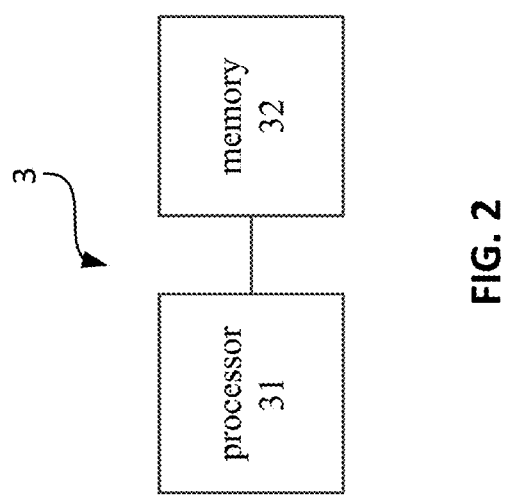
FIG. 2 is a schematic block diagram according to a computer according to an exemplary embodiment of the present invention.

Further, the method of the present application may be achieved by a software program. Therefore, the present application further provides a computer with a function of playing music. The computer may be a mobile phone, a desktop computer, a notebook computer, a tablet computer or other similar devices. Referring to FIG. 2, the computer 3 includes a processor 31 and a memory 32 electrically connected to each other. The memory 32 includes a software program. The processor 31 executes the software program in the memory 32 to achieve the above method of playing music. That is, all of the above various computers can provide a user interaction interface, so that the user inputs an instruction or selects a function, so as to achieve two-way communication.

When the playing pool is provided in Step S11 in FIG. 1, the playing pool may be automatically formed or may also be manually formed by a user selection. Almost all music playing software has a playlist function. That is, each playlist includes a plurality of pieces of music (or songs), the music (or songs) can be sequentially or randomly played, and this is known in the art, so that the description is not repeated herein. The playing pool formed in this step includes a plurality of playlists. All playlists may be automatically selected to form the playing pool. Alternatively, the playing pool may be formed by manually selecting (adding) at least two (or more) playlists. by the user, or manually deleting the playlists in the playing pool by the user. Furthermore, all playlists may be automatically added, or the playlists may be added or deleted through user operation by utilizing the user interaction interface of the computer, so as to form the playing pool.

Each piece of music includes at least one attribute. The attributes may be self-defined or self-contained by the music. Preferably, the attributes may include: a singer name, a song name, an album name, a publication year, a rock and roll type, a blues type, a ballad type and/or a lyric type, etc., or other metadata related to the music. Each piece of music includes one or more attribute. For example, a song may be a rock and roll song sung by a singer A in 2005, so the song includes more than one attribute.

In an exemplary embodiment, the user interaction interface of the computer may be utilized for a user to operate and to select any one attribute as a defined attribute. For example, if the user wants to listen to blues music, a plurality of attribute options including blues are displayed on the user interaction interface, and the defined attribute will be "blues" after the user ticks blues.

Then, in Step S12 of FIG. 1, it performs comparing music in any two playlists from the playing pool. If at least one attribute of any two pieces in different playlist respectively is determined to be identical, the two pieces of music is defined as pairing music. The pairing music is not on the same playlist. That is, the comparison performed herein is attribute comparison performed on the music in any two playlists of the playing pool. When at least one attribute is determined to be the identical attribute, the music is defined as the pairing music. In order to improve the comparison accuracy, a plurality of attributes may be compared. The music is defined as the pairing music only if a pairing criterion is met. The pairing music is respectively stored in the two playlists of a playing pool instead of the same playlist. Preferably, the comparison is a comparison performed according to the defined attribute selected by the user. That is, the pairing music is the music respectively containing the "defined attribute".

If any one attribute of any two pieces of music is not determined to be identical, the pairing music cannot be selected, and prompt is displayed on the user interface for the user.

In Step S13 in FIG. 1, when the music in any playlist is played, and when the playing sequence comes to the pairing music, according to the pairing music, the playing sequence comes to another one of paring music in the playlist. That is, the playing switches to another playlist for continuous playing.

Figure 3:
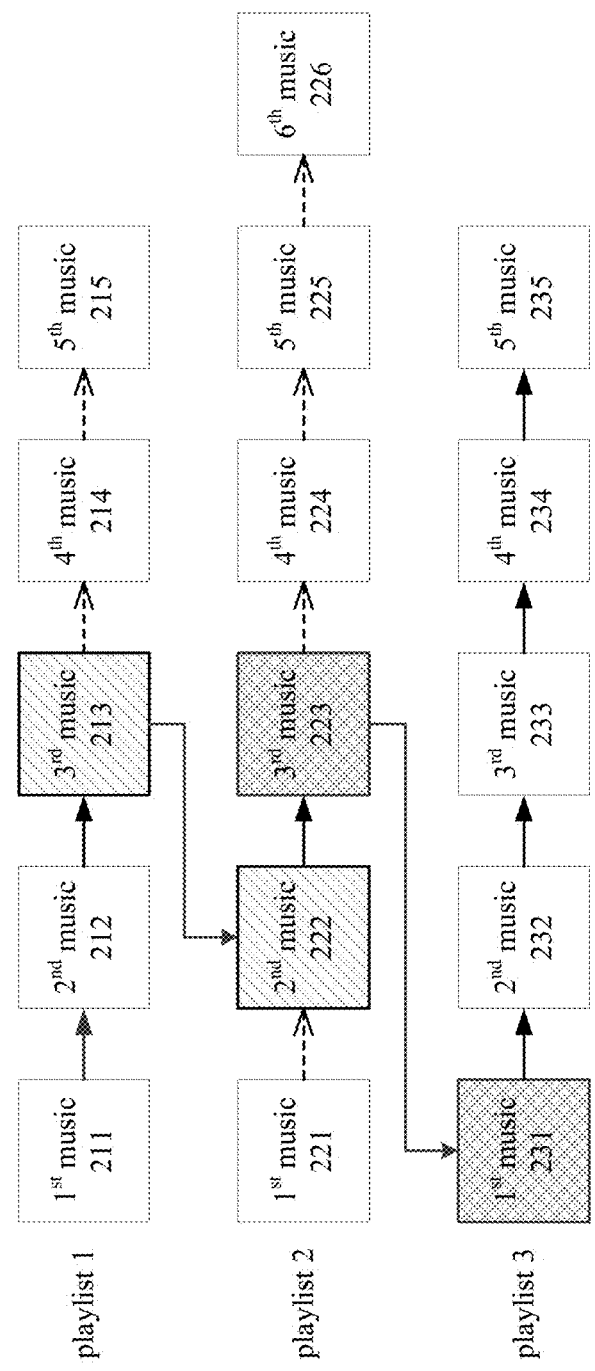
FIG. 3 to FIG. 5 show music playing sequences under various different conditions according to the method of playing music of the present application.

Referring to FIG. 3, generally, when the user listens to music, sequential playing will be performed according to the playlist. Conventionally, by taking a playlist 1 as an example, the playing sequence of the music will be $1^{st}$ music 211, $2^{nd}$ music 212, $3^{rd}$ music 213, $4^{th}$ music 214 and finally, $5^{th}$ music 215. According to the method of playing music of the present application, the played music can be closer to the music the user really wants to listen to. Switching is performed before the playlist is completely played. For example, after music comparison between the playlist 1 and the playlist 2, two pieces of music, including $3^{rd}$ music 213 in the playlist 1 and $2^{nd}$ music 222 in the playlist 2, meet the pairing condition (i.e., the two pieces of music have at least one attribute determined to be the same attribute, or have the defined attributes determined to be identical), so that the two pieces of music are pairing music. After music comparison between the playlist 2 and a playlist 3, two pieces of music, including $3^{rd}$ music 223 in the playlist 2 and $1^{st}$ music 231 in the playlist 3, meet the pairing condition (i.e., the two pieces of music have at least one attribute determined to be the same attribute, or have the defined attributes determined to be identical), so that the two pieces of music are pairing music. Therefore, in an embodiment in FIG. 3, the playing sequence listened to by the user will be the $1^{st}$ music 211, the $2^{nd}$ music 212 and the $3^{rd}$ music 213 in the playlist 1, then, next switches to the $2^{nd}$ music 222 and the $3^{rd}$ music 223 in the playlist 2, and next switches again to the $1^{st}$ music 231, $2^{nd}$ music 232, $3^{rd}$ music 233, $4^{th}$ music 234 and $5^{th}$ music 235 in the playlist 3.

The above playing sequence is only for convenience of illustrative description, not used to limit the present application. Actually, the playing sequence of each playlist may be random. For example, the playlist 1 may first play the $4^{th}$ music 214, second play the $2^{nd}$ music 212, and continuous playing until the $3^{rd}$ music 213, and then the playback switch to the next playlist 2 for continuous playing. The music playing sequence in the playlist is the known art, so that the description is not repeated herein.

Figure 4:
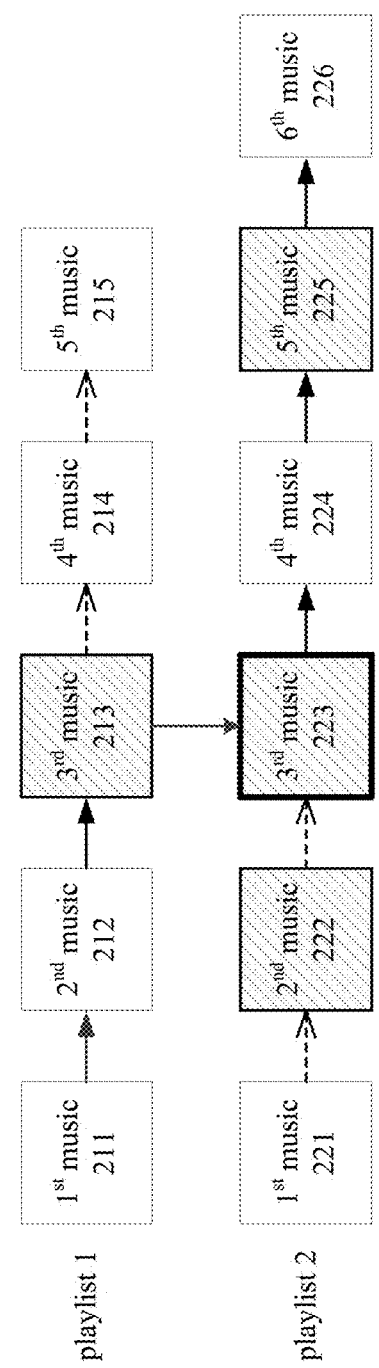

In an exemplary embodiment, when there is more than one pairing music, only one pairing music may be randomly selected, and the playback will come to the selected pairing music. Referring to FIG. 4, after music comparison between the playlist 1 and the playlist 2, four pieces of music, including the $3^{rd}$ music 213 in the playlist 1 and the $2^{nd}$ music 222 in the playlist 2, the $3^{rd}$ music 213 in the playlist 1 and the $3^{rd}$ music 223 in the playlist 2, and the $3^{rd}$ music 213 in the playlist 1 and $5^{th}$ music 225 in the playlist 2, meet the pairing condition (i.e., the four pieces of music have at least one attribute determined to be the same attribute, or have the defined attributes determined to be identical), so that there are three pairing music in this example. According to the method of the present application, one pairing music will be randomly selected for switching the playback. For example, in an embodiment of FIG. 4, the playing sequence listened to by the user is that the $1^{st}$ music 211, the $2^{nd}$ music 212 and the $3^{rd}$ music 213 in the playlist 1, then, switching to the $3^{rd}$ music 223, $4^{th}$ music 224, the $5^{th}$ music 225 and $6^{th}$ music 226 in the playlist 2.

When a plurality of pairing music are generated, besides the above random selection, which pairing music will be selected as a switching point for the playback may also be determined according to the total quantity of music in the playlist. For example, during selection in FIG. 4, if the switching point is selected to be played at the $2^{nd}$ music 222 or $5^{th}$ music 225 in the playlist 2, the music to be played in the playlist 2 is obviously much more than the music to be played in the playlist 1. Therefore, by selecting the $3^{rd}$ music 223 in the playlist 2, the quantities of the music to be played in the playlist 1 and the playlist 2 may be close to the even. That is, the quantities of the music to be played in the two playlists tend to be equivalent.

Figure 5:
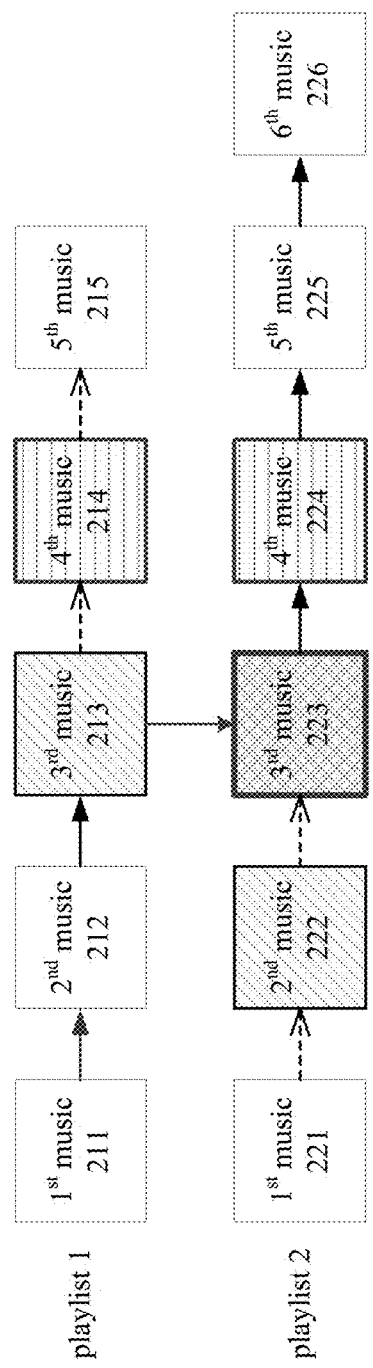

Additionally, it may also generate more than pairing music because there are a plurality of pieces of pairing music in the two lists of playlists respectively. As shown in FIG. 5, after music comparison between the playlist 1 and the playlist 2, three pieces of music, including the $3^{rd}$ music 213 in the playlist 1 and the $2^{nd}$ music 222 in the playlist 2, and the $3^{rd}$ music 213 in the playlist 1 and the $3^{rd}$ music 223 in the playlist 2, meet the pairing condition (i.e., the three pieces of music have at least one attribute determined to be the same attribute, or have the defined attributes determined to be identical). Additionally, two pieces of music, including the $4^{th}$ music 214 in the playlist 1 and the $4^{th}$ music 224 in the playlist 2, meet the pairing condition (i.e., the two pieces of music have at least one attribute determined to be the same attribute, or have the defined attributes determined to be identical). Therefore, there are still three pairing music in total. Similarly, the selection of switching point may be randomly performed. Alternatively, the selection of switching point may be performed according to the total quantity of music to be played in the playlist, as described above.

Besides randomness and music quantity as determining weight for pairing music selection, the number of times of the playlist selected to be played by the user may also be used as a selection weight. For example, a condition that the playlist 1 is obviously selected to be played for many times may represent that the user prefers the playlist, and for the pairing music selection, the music played for more times in the playlist 1 may be used as one of selection and determination basis.

According to the above various methods for determining and selecting the pairing music, the user interaction interface (of a computer) may also be utilized for the user to operate and to select any one method of above to select the pairing music. For example, the user interaction interface displays options of selecting "frequently listened playlists", "same quantity of music to be played in each playlist", "random play", etc. for the user to select.

Based on the above, when the users select the attribute of music which they want to listen to, according to the method of the present invention, a result that highly similar music is selected to be played, and the music which the users really want to listen to is provided can be achieved.

Although the present application has been disclosed with reference to the above embodiments, the embodiments are not intended to limit the present application. A person skilled in the art may make some variations and improvements without departing from the spirit and scope of the present application. Therefore, the protection scope of the present application should be subject to the appended claims.

What is claimed is:

1. A method of playing music, comprising:
   providing a playing pool, wherein the playing pool comprises a plurality of playlists, each playlist comprises at least one piece of music, and each piece of music comprises at least one attribute;
   comparing all music in any two playlists of the plurality of playlists, and if at least one attribute of a piece of music in a first playlist is determined to be identical to another piece of music in a second playlist, defining the two pieces of music as pairing music, wherein the first playlist is not the same with the second playlist; and
   playing the music in one of the plurality of playlists, and after playing one piece of the pairing music in the first playlist, switching to play the other one piece of the pairing music in the second playlist.

2. The method of playing music according to claim 1, wherein according to the at least one attribute, any one attribute is selected as a defined attribute; and
   wherein in said comparing all music in any two playlists, the at least one attribute of the pairing music is determined to be identical and to be respectively the defined attribute.

3. The method of playing music according to claim 1, wherein if there is no any attribute between any two pieces of music determined to be identical, a prompt is displayed.

4. The method of playing music according to claim 1, wherein when there are more than one pairing music, said pairing music is randomly selected and the corresponding piece of the selected pairing music in one of the plurality playlists is played.

5. The method of playing music according to claim 1, wherein when there are more than one pairing music, one piece of the pairing music in the first and second playlists is selected as a switching point based on quantities of music to be played in the first and second playlists, so as to adjust played quantities of the music in the first and second playlists being close to equivalence.

6. The method of playing music according to claim 1, wherein the at least one attribute comprises a singer name, a song name, an album name, a publication year, a rock and roll type, a blues type, a ballad type and/or a lyric type.

7. The method of playing music according to claim 1, wherein said providing the playing pool comprises automatically selecting all of the playlists to form the playing pool.

8. The method of playing music according to claim 1, wherein said providing the playing pool comprises manually selecting at least two playlists to form the playing pool.

9. The method of playing music according to claim 1, wherein when there are more than one pairing music, a number of playing times of the playlist of the pairing music is used as a selection wight.

10. The method according to claim 1, wherein said comparing all music in any two playlists of the plurality of playlists comprises automatically comparing all music in any two playlists of the plurality of playlists.

11. A computer with a function of playing music, comprising a processor and a memory electrically connected to each other, wherein the memory comprises a software program, and the processor executes the software program of the memory to achieve the following mechanisms:
   providing a playing pool, wherein the playing pool comprises a plurality of playlists, each playlist comprises at least one piece of music, and each piece of music comprises at least one attribute;

comparing all music in any two playlists of the plurality of playlists, and if at least one attribute of a piece of music in a first playlist is determined to be identical to another piece of music in a second playlist, defining the two pieces of music as pairing music, wherein the first playlist is not the same with the second playlist; and playing the music in one of the plurality of playlists, and after playing one piece of the pairing music in the first playlist, switching to play the other one piece of the pairing music in the second playlist.

* * * * *